(12) United States Patent
Schaefer (10) Patent No.: US 8,353,186 B2
(45) Date of Patent: Jan. 15, 2013

(54) HOOP LOCK

(75) Inventor: Hans-Theo Schaefer, Rennerod (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 59 days.

(21) Appl. No.: 12/818,240

(22) Filed: Jun. 18, 2010

(65) Prior Publication Data

US 2010/0319414 A1 Dec. 23, 2010

(30) Foreign Application Priority Data

Jun. 23, 2009 (DE) .................. 10 2009 030 031

(51) Int. Cl.
*B62H 5/00* (2006.01)
*E05B 71/00* (2006.01)
(52) U.S. Cl. ................ 70/233; 70/20; 70/38 R
(58) Field of Classification Search ............... 70/20, 31, 70/35, 38 R, 38 A, 38 B, 38 C, 233
See application file for complete search history.

(56) References Cited

U.S. PATENT DOCUMENTS

| | | | |
|---|---|---|---|
| 241,279 A | 5/1881 | Barth | |
| 1,997,490 A | 4/1935 | Hoar | |
| 3,835,675 A * | 9/1974 | Lippisch | 70/38 A |
| 3,882,699 A * | 5/1975 | Flack et al. | 70/38 A |
| 3,908,415 A | 9/1975 | Foote | |
| 4,290,279 A * | 9/1981 | Fish et al. | 70/38 A |
| 4,776,187 A * | 10/1988 | Evans et al. | 70/38 A |
| 4,998,422 A * | 3/1991 | Borgmann et al. | 70/38 A |
| 5,931,030 A * | 8/1999 | Chen | 70/38 A |
| 6,393,876 B1 * | 5/2002 | Matyko | 70/38 A |
| 6,769,277 B1 * | 8/2004 | Chang | 70/52 |
| 6,813,913 B2 * | 11/2004 | Watts | 70/38 A |
| 7,278,283 B2 * | 10/2007 | Meckbach | 70/38 R |
| 7,380,425 B2 * | 6/2008 | Elliott et al. | 70/56 |
| 2009/0145704 A1 | 6/2009 | Weiershausen | |
| 2009/0145705 A1 | 6/2009 | Weiershausen | |

FOREIGN PATENT DOCUMENTS

| | | |
|---|---|---|
| DE | 1 035 008 A | 7/1958 |
| DE | 1 035 008 B | 7/1958 |
| DE | 33 08 977 A1 | 4/1984 |

(Continued)

OTHER PUBLICATIONS

German Search Report dated Apr. 16, 2010 DE 10 2009 030 031.7.

*Primary Examiner* — Christopher Boswell
(74) *Attorney, Agent, or Firm* — Gifford, Krass, Sprinkle, Anderson & Citkowski, P.C.

(57) ABSTRACT

The invention relates to a hoop lock having a lock body and a hoop which is movable relative to the lock body between an open position and a closed position. The lock body has a lock housing and a closing mechanism which is fastened in the lock housing and has a driver. The driver is selectively movable into an unlatched position or into a latched position. A latching device is furthermore provided in the lock body and acts between the driver of the locking mechanism, the hoop and the lock housing. The latching device latches the hoop to the lock housing when the hoop is in the closed position and the driver of the locking mechanism is in the latched position. At least a part of the latching device is movable together with the hoop between the open position and the closed position of the hoop.

21 Claims, 6 Drawing Sheets

FOREIGN PATENT DOCUMENTS

| | | |
|---|---|---|
| DE | 33 08 977 C2 | 4/1984 |
| DE | 44 34 585 A1 | 4/1996 |
| DE | 297 22 017 U1 | 2/1998 |
| DE | 197 13 256 A1 | 10/1998 |
| EP | 1 764 292 A2 | 3/2007 |
| EP | 1 764 292 B1 | 3/2007 |
| EP | 1 764 293 A2 | 3/2007 |
| EP | 1 764 293 B1 | 3/2007 |
| WO | WO-97/01012 A1 | 1/1997 |

* cited by examiner

HOOP LOCK

CROSS-REFERENCE TO RELATED APPLICATIONS

This application claims priority of German patent application 10 2009 030 031.7 filed Jun. 23, 2009.

FIELD OF THE INVENTION

The invention relates to a hoop lock having a lock body and a hoop which is movable relative to the lock body between an open position and a closed position. The lock body has a lock housing and a closing mechanism which is fastened in the lock housing and has a driver. The driver is selectively movable into an unlatched position or into a latched position. A latching device is furthermore provided in the lock body and acts between the driver of the locking mechanism, the hoop and the lock housing. The latching device latches the hoop to the lock housing when the hoop is in the closed position and the driver of the locking mechanism is in the latched position.

BACKGROUND OF THE INVENTION

Such a hoop lock is known, for example, as a padlock which has an essentially U-shaped hoop. The hoop can be guided through an eyelet or the like in its open position to secure an object (e.g. a door with hasp).

In another embodiment, such a hoop lock is made as a brake disk lock which serves for the securing, for example, of a motorcycle, of a motor scooter or of a quad bike against unauthorized use. The hoop for this purpose engages through an opening of a brake disk of the parked vehicle. The lock is thus trapped at the brake disk by the hoop latched in the closed position and the use of the vehicle is prevented until the lock is again released from the brake lock.

The latching device of such a hoop lock must have parts movable within the lock housing to be able to latch the hoop selectively to the lock body in its closed position. For this purpose, the lock housing usually has different holding and guide sections for the movable parts of the latching device which are in particular of a three-dimensional structure. The lock housing hereby, however, has an undesirably complex design and is accordingly expensive in manufacture. In addition, the lock body has a width which is undesirably large for some applications when the latching device is received between the driver of the locking mechanism and the hoop in a holding and guide section of the lock housing.

It is an object of the invention to provide a hoop lock having a lock body and a movable hoop which has a simple structure and allows a narrow construction shape.

This object is satisfied by a hoop lock having the features of claim 1 and in particular in that at least a part of the latching device is movable together with the hoop between the open position and the closed position of the hoop.

In this hoop lock in accordance with the invention, at least some of those elements which act between the driver of the locking mechanism, the hoop and the lock housing to latch the hoop to the lock housing in its closed position are not only movable between an unlatched position and a latched position (which is typically possible in a direction perpendicular to the axis of actuation of the locking mechanism. The respective part of the latching device is rather also movable together with the hoop between the open position and the closed position of the hoop (in particular parallel to the axis of actuation of the locking mechanism). In this respect, the circumstance is utilized that the respective part of the latching device anyway does not have to satisfy any latching function when the hoop is not in the closed position, but rather in the open position or in an intermediate position.

It is thus possible to hold and/or to movably support a part of the latching device or the total latching device in the movable hoop. The lock housing can thus have a particularly simple structure, in particular having simpler holding and guide sections for the latching device or even without such holding and guide sections.

A further advantage is that the latching device (at least partly received in the hoop) can cooperate at an outer side of the hoop with the lock housing to latch the hoop in its closed position at the lock housing when the driver of the locking mechanism and thus the latching device are in the latched position. In this connection a side of the hoop is to be understood as the outer side of the hoop which is remote from an axis of actuation of the locking mechanism (usually extending through a central region of the lock body). A particularly narrow construction shape of the lock body is hereby possible, in particular in a direction perpendicular to the axis of actuation of the locking mechanism and/or perpendicular to the direction of movement of the hoop. The driver of the locking mechanism, the latching device, the hoop and the lock housing namely do not have to be arranged strictly following and next to one another, as is in particular the case with known padlocks. It is instead possible, for example, that only the latching device and the lock housing are arranged next to one another, whereas the hoop engages around a part of the latching device (in particular the movable part).

To the extent that reference is made in connection with the invention to the "movable part" of the latching device, that part of the latching device is to be understood hereby which is movable together with the hoop between the open position and the closed position of the hoop.

SUMMARY OF THE INVENTION

Advantageous embodiments of the invention are named in the following and in the dependent claims.

The movable part of the latching device is preferably received in a holding section of the hoop, at least while the hoop is moved between the open position and the closed position. No corresponding holding or guide section is thereby necessary at the inner side of the lock housing, or such a holding or guide section of the lock house can have a simplified structure. The named holding section at the hoop can, in contrast, be made in a simple manner, for example by introduction of a bore.

The named holding section of the hoop can serve the purpose in accordance with an advantageous embodiment to cooperate with the latching device to latch the hoop to the lock housing in its closed position. It is preferred for this purpose if the movable part of the latching device is partly received in the named holding section of the hoop and partly engages into an engagement opening of the lock housing when the hoop is in the closed position and when the driver of the locking mechanism and thus also the latching device are in the latched position.

It is further preferred if the named holding section of the hoop remains in the lock body, while the hoop is moved between the open position and the closed position, that is in particular also in the open position of the hoop. The movable part of the latching device held in the hoop is hereby always reliably captured in the lock body.

It is particularly advantageous if the hoop is movably supported at a guide surface at an inner side of the lock housing, with this guide surface simultaneously securing the movable part of the latching device in the named holding section of the hoop while the hoop is moved between the open position and the closed position. In other words, the guide surface of the lock housing not only forms a sliding fit for the movable hoop, but rather also still holds the movable part of the latching device captured in the holding section of the hoop so that it does not unintentionally leave the holding section of the hoop during the movement of the hoop.

The latching device of the lock body can be made in multiple parts, with one part being movable together with the hoop and another part, in contrast, not following the movement of the hoop when it moves between the open position and the closed position. The latching device can in particular have at least one latch element and a rotationally movable drive element, with the drive element being coupled or couplable to the drive of the locking mechanism (e.g. rotationally fixedly or with spring bias) and has at least one cam section. This cam section cooperates with the at least one latch element in order to move it to the side when the driver is rotated from the unlatched position into the latched position by corresponding actuation of the locking mechanism.

The named latch element can be a latching ball, for example. Alternatively, a latching pin or a latching plate can also be provided. The named drive element can be formed by a ball slider, for example.

Two similar latch elements are preferably provided which cooperate with the drive element at two mutually oppositely disposed sides thereof.

The named drive element of the latching device can be rigidly coupled to the driver of the locking mechanism, i.e. not only rotationally fixedly, but also in an axial direction, with only the named at least one latch element being movable together with the hoop between the open position and the closed position. In this case, the latch element is moved into engagement or out of engagement with the drive element when the hoop is moved between the open position and the closed position. Alternatively to this, it is, however, also possible that the total latching device, which acts between the driver, the hoop and the lock housing, is movable together with the hoop between the open position and the closed position of the hoop. Provision can therefore in particular be made that the named drive element is also movable together with the hoop. In this case, the drive element is brought into engagement or out of engagement with the driver of the locking mechanism when the hoop is moved between the open position and the closed position.

The lock housing can generally have at least one outer housing in connection with the invention. The lock housing has a particularly secure, and nevertheless inexpensive design when it has an outer housing which is formed by a tubular section having a longitudinal axis which extends parallel to the direction of movement of the hoop. Such a tubular section can have a substantially rectangular cross-section, i.e. the outer housing can substantially be formed by a square-end section, naturally having the required rounded portions and cut-outs (e.g. reception gap for a brake disk, such as will be explained in the following). The outer housing can hereby be formed in a simple manner as a one-part, stable hollow body which can in particular be manufactured by extrusion and optionally bend forming and/or hardening.

The hoop lock has a particularly simple handling when the hoop is biased in the direction of its open position. The hoop is thus automatically moved out of the lock body as soon as the driver is brought into the unlatched position by corresponding actuation of the locking mechanism.

In accordance with a preferred embodiment, the hoop substantially has an L shape with respect to its open position outside the lock body, with the hoop having an elongate securing section and an elongate connection section. The securing section extends transversely to the direction of movement of the hoop, i.e. perpendicular to the direction of movement of the hoop or at an acute angle (angle)<45° to the direction of movement of the hoop. The securing section has a free end. The connection section, in contrast, extends substantially parallel to the direction of movement of the hoop and connects the securing section to the lock body (in particular via the named holding section of the hoop). The hoop is thus substantially hook-shaped in its open position and open to the side. The named free end of the securing section can thus be introduced into a fastening opening of an object to be secured (e.g. an eyelet, brake disk ventilation opening). A form-fit of the securing section of the hoop with the lock body is effected by movement of the hoop into the closed position to fix the hoop lock to the respective object.

It is further preferred in this embodiment if the lock body has a reception gap which is made for the reception of the object or of a part thereof to be secured. In this case, the securing section of the hoop closes the reception gap when the hoop is in the closed position.

It is preferred in this respect if the securing section of the hoop has a widened blocking portion at least at the named free end, said widened blocking portion projecting beyond the lock housing slightly in the closed position of the hoop, with the lock housing having an associated engagement recess at its outer side flush with the respective widened Mocking portion of the securing section of the hoop. The respective engagement recess is formed to receive the associated widened blocking portion if the lock housing is pressed apart in the region of the reception gap. In other words, the widened blocking portion of the hoop comes into engagement with the engagement recess of the lock housing in the case of an attempted breaking open by widening the named reception gap, whereby a clawing of the hoop to the lock body is achieved. A violent release of the form fit between the hoop and the lock body is thereby prevented or at least made substantially more difficult. Such a widened blocking portion which cooperates with a respective engagement recess of the lock body is preferably provided at both ends of the securing section of the hoop.

To be able to fix the lock particularly simply to the object to be secured in the case of the explained L-shaped design of the hoop, it is further preferred if the named reception gap extends parallel to the direction of movement of the hoop or at an acute angle thereto, i.e. at an angle <45°. A specific oblique position is particularly advantageous in the case of an embodiment of the hoop lock as a brake disk lock since the handling is hereby simplified, in particular the actuation of the locking mechanism, when the lock is fixed to a brake disk of a vehicle wheel.

When a key introduction opening of the locking mechanism which is provided at a side of the lock body disposed opposite the reception gap is arranged laterally offset with respect to the direction of extent of the reception gap, this also contributes to a simplified handling of the lock. In other words, the key introduction opening should be arranged off-center at the respective side of the lock body. If the lock is fixed at a brake disk of a vehicle, it is prevented by this off-center arrangement that the access to the locking mechanism is made more difficult for the user by parts of the vehicle.

The invention also relates to the use of a hoop lock of the named kind as a brake disk lock.

BRIEF DESCRIPTION OF THE DRAWINGS

The invention will be explained in the following only by way of example with reference to the drawings, with the invention not being restricted to the brake disk lock described in the following, but rather also being used in other lock types, for example in padlocks.

DETAILED DESCRIPTION OF THE PREFERRED EMBODIMENTS

Figure 1:
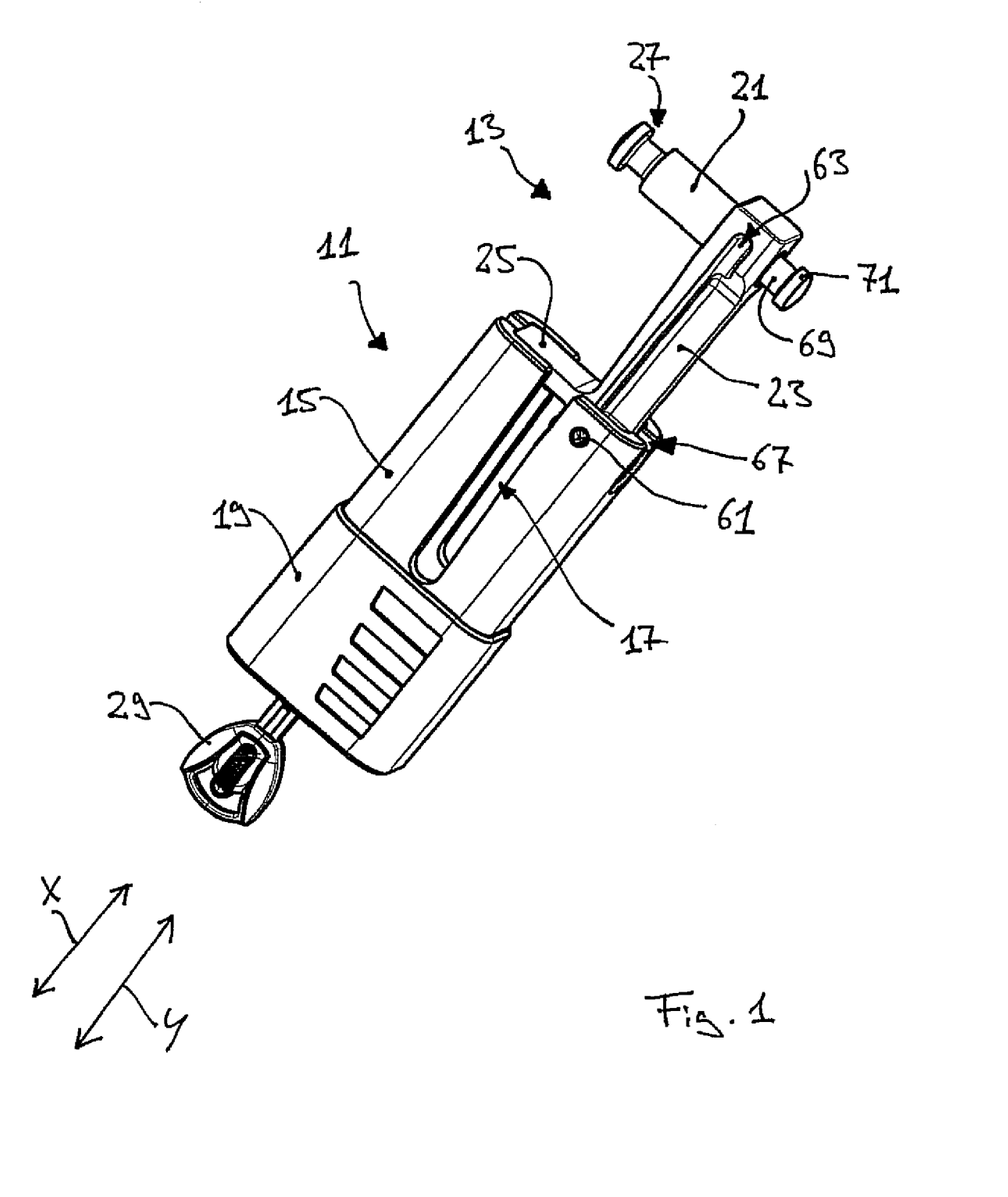
FIGS. 1 and 2 show a perspective view of a brake disk lock in an open position and a closed position respectively of the hoop.
Figure 2:
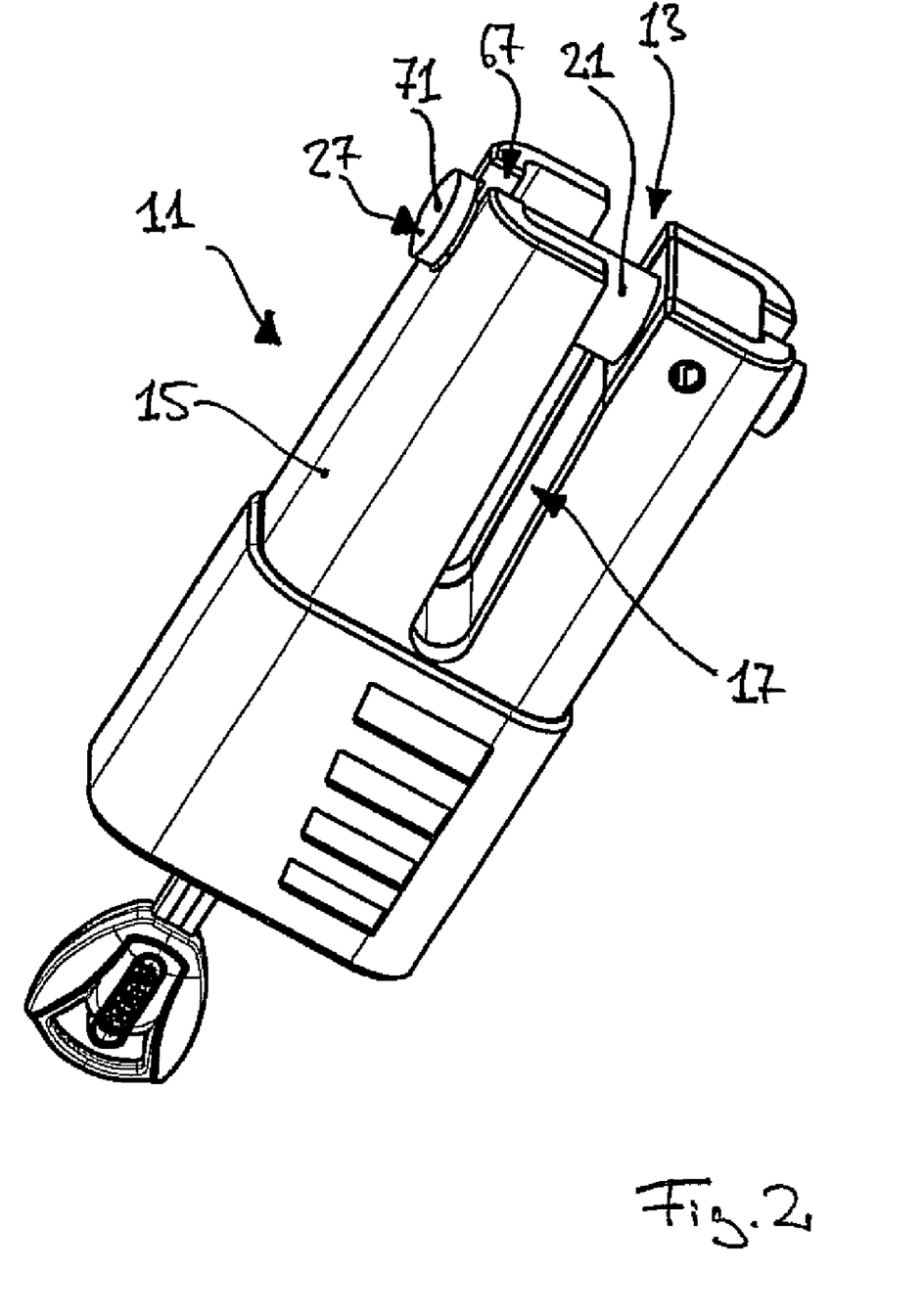

FIGS. 1 and 2 show a hoop lock which is made as a brake disk lock and has a lock body 11 and a hoop 13. The hoop 13 is supported movable in translation at the lock body 11. FIG. 1 shows the hoop 13 in an open position, whereas FIG. 2 shows the hoop 13 in an closed position.

The lock body 11 has an outer housing 15 which is formed by a tubular section having a substantially rectangular cross-section and rounded edges. The longitudinal axis of the outer housing 15 corresponds to the direction of movement X of the hoop 13. The outer housing 15 has a reception gap 17 at the end provided for the moving out of the hoop 13.

The outer housing 15 is provided with a cover 19 of plastic at the other end. With respect to the open position in accordance with FIG. 1, that is when the hoop 13 is moved out of the lock body 11, the hoop 13 substantially has an L-shape outside the lock body 11. The one limb of this L-shape is formed by an elongate securing section 21 in the form of a hardened pin 21 which extends perpendicular to the direction of movement X of the hoop 13. The other limb of the L shape is formed by an elongate connection section 23 which extends parallel to the direction of movement X. The connection section 23 merges within the lock body 11 into a holding section 25 as will be explained in the following. The connection section 23 and the holding section 25 are formed by a single cast part.

The brake disk lock shown serves for the securing of a motorcycle or the like against an unauthorized use. For this purpose, the free end 27 of the securing section 21 is introduced into an opening of a brake disk of the respective vehicle in the open position of the hoop 13 in accordance with FIG. 1. Subsequently, the lock body 11 is placed onto the brake disk such that the brake disk engages into the reception gap 17 and the hoop 13 adopts the closed position in accordance with FIG. 2 in which the securing section 21 of the hoop 13 closes the reception gap 17. A latching device which will be explained in the following is then actuated by means of an associated key 29 to latch the hoop in the closed position relative to the lock body 11. The brake disk lock is thus fixed to the brake disk.

Figure 3:
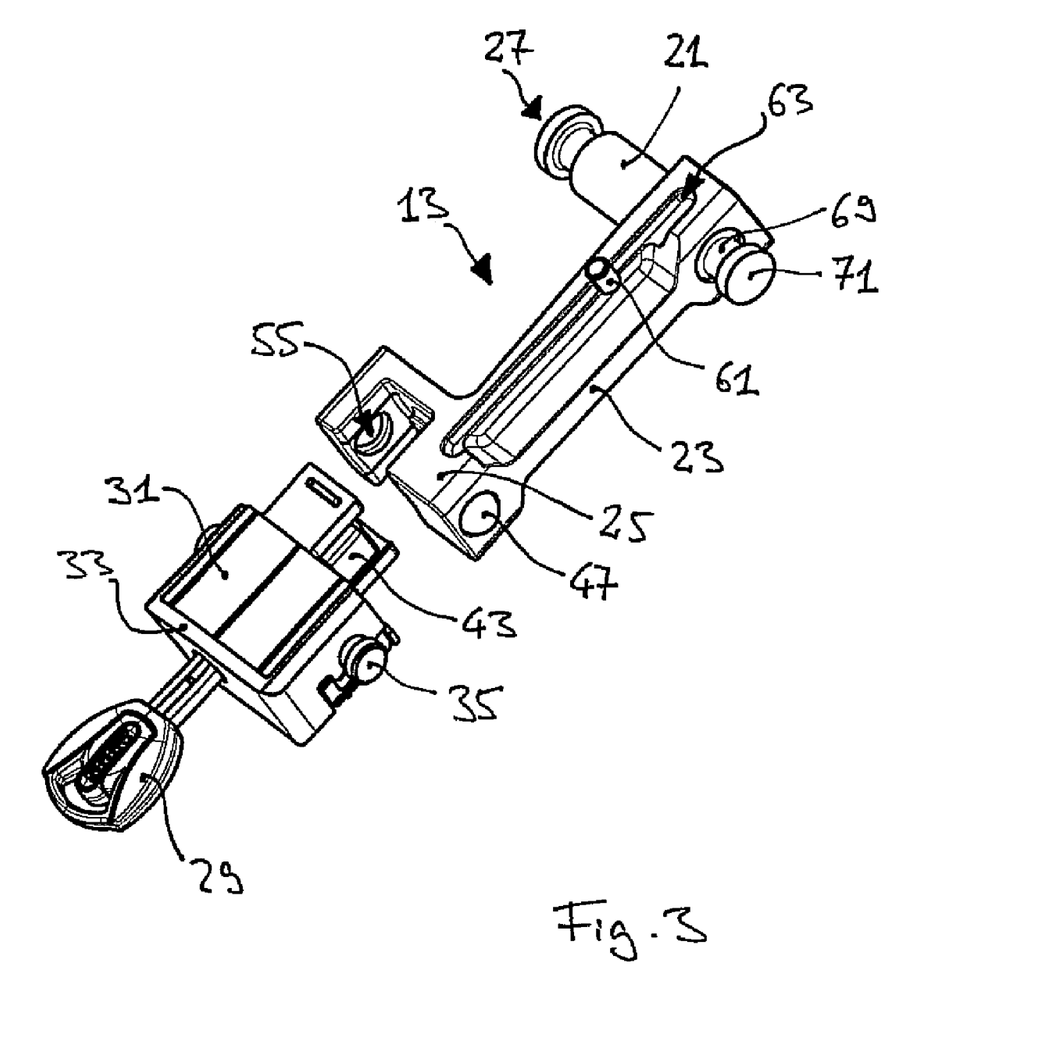
FIG. 3 shows the brake disk lock in an intermediate position of the hoop with removed outer housing.

FIG. 3 shows the hoop 13 in an intermediate position, with the outer housing 15 and the cover 19 of the lock body 11 being omitted. The already named holding section 25 of the hoop 13 as well as an inner housing 31, a U-shaped metal cover sheet 33 and two fastening pins 35 of the lock body can thus be recognized.

Figure 4:
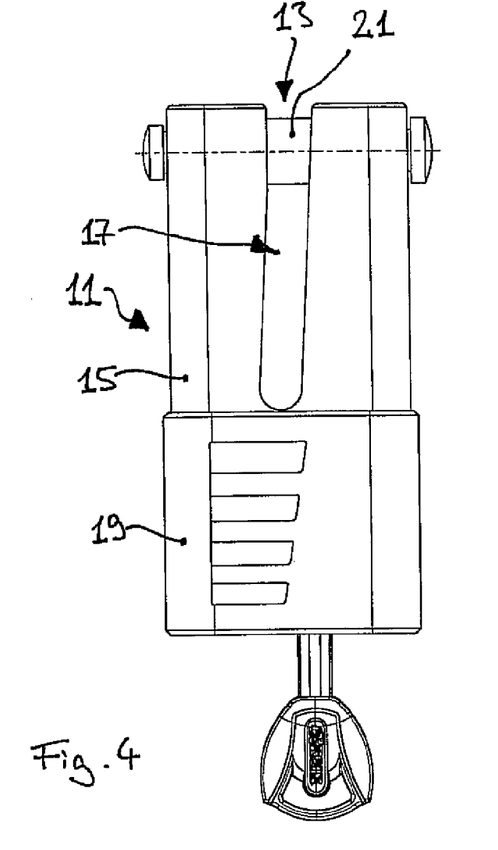
FIGS. 4, 5 and 6 show a front view, a side view and a plan view respectively of the brake disk lock.
Figure 5:
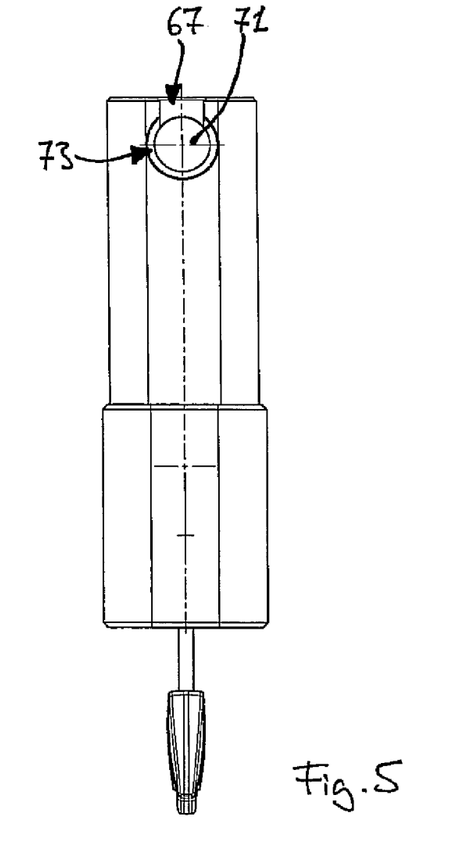
Figure 6:
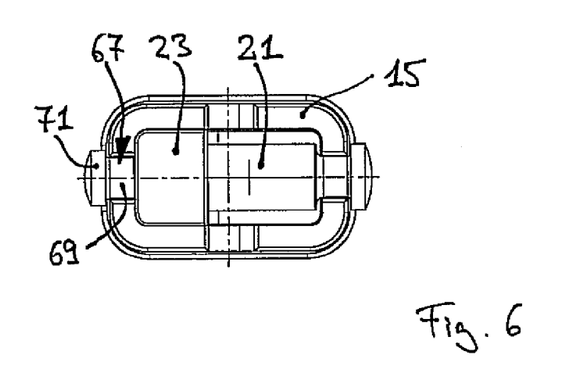

FIGS. 4 to 6 show further details of the brake disk lock, with the hoop 13 being in the closed position.

The structure of the brake disk lock will be explained in even more detail in the following with reference to FIGS. 7 to 10.

A locking mechanism 37 in the form of disk lock cylinder is received in the lock body 11 and has, in a known arrangement, a rotationally fixedly held cylinder housing and a cylinder core rotatable in the cylinder housing. The locking mechanism 32 is seated in the inner housing 31 and is fixedly connected via the limb of the metal covering sheet 33 and the fastening pins 35 to the outer housing 15. The locking mechanism 37 has a driver 39 which is rotationally movable by means of the associated key 29, and indeed between the shown latched position and an unlatched position offset by 90° thereto.

The driver 39 cooperates with a latching device 41. It has a drive element 43 which is rigidly, and thus rotationally fixedly, coupled with the driver 39. The drive element 43 is made as a ball slider and has an oval cross-section. The jacket surface of the drive element 43 thus forms a cam surface 45 which has a radius varying in the peripheral direction with respect to the axis of actuation Z of the locking mechanism 37. The latching device 41 furthermore has two latch elements 47 in the form of latching balls as well as a likewise spherical spacer element 49. The latching device 41 acts between the driver 39 of the locking mechanism 37, the hoop 13 and the outer housing 15 of the lock body 11, with the latching device 41 latching the hoop 13 to the outer housing 15 when the hoop 13 is in the closed position and the driver 39 is in the latched position. As is shown in FIG. 9, the driver 39 in the latched position urges the latch elements 47 radially outwardly with respect to the axis of actuation Z (FIGS. 7 and 9) so that the two latch elements 47 engage into a respective engagement opening 51 at the inner side of the outer housing 15 and thus block the hoop 13 against a movement relative to the outer housing 15.

A special feature of the shown brake disk lock is that a part of the latching device 41, namely the two latch elements 47 and the spacer element 49, is movable together with the hoop 13 between the open position and the closed position of the hoop 13. For this purpose, the latch elements 47 and the spacer element 49 are not, for instance, held and guided in the inner housing 31, but rather in the holding section 25 of the hoop 13 which engages peripherally around the latch elements 47 and the spacer element 49 and thus carries them along the direction of movement X. In the closed position of the hoop 13 in accordance with FIG. 9, when the driver 39 is in the latched position, the latch elements 47 engaging into the engagement openings 51 of the outer housing 15 are partly received in the holding section 25 of the hoop 13.

Figure 7:
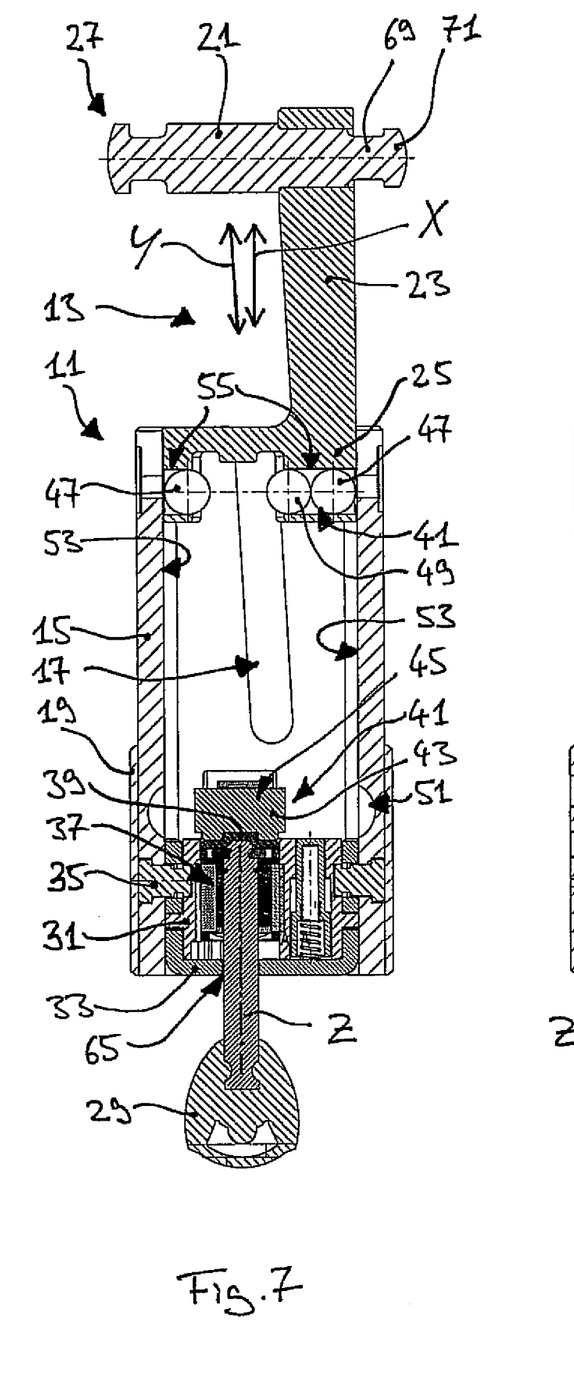
FIG. 7 shows a central longitudinal section of the brake disk lock in the open position of the hoop.
Figure 8:
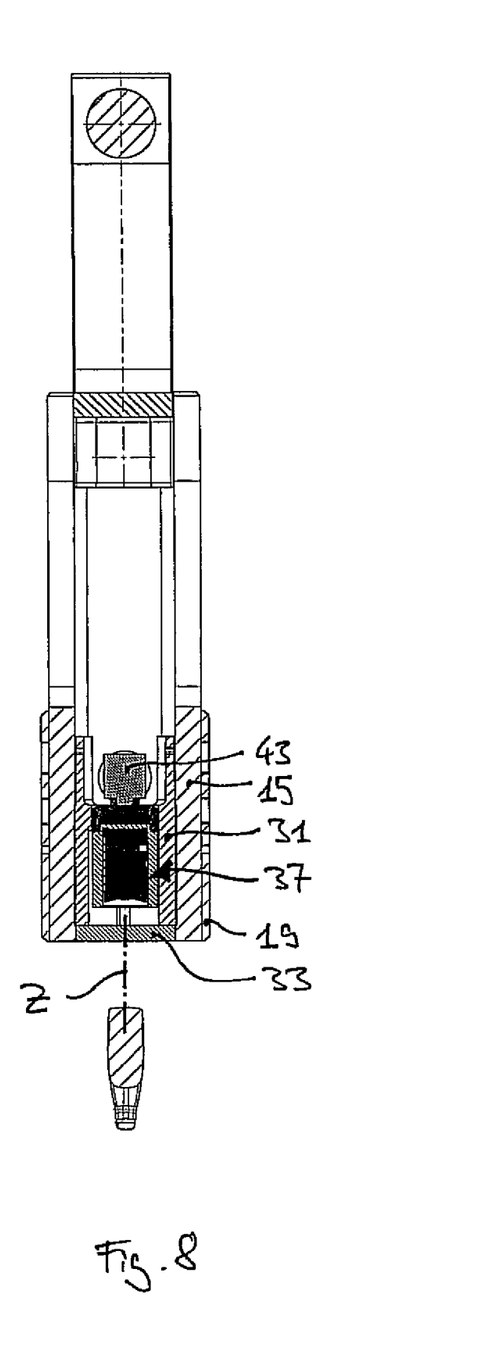
FIG. 8 shows a central longitudinal section along a plane which is perpendicular to the sectional plane in accordance with FIG. 7.
Figure 9:
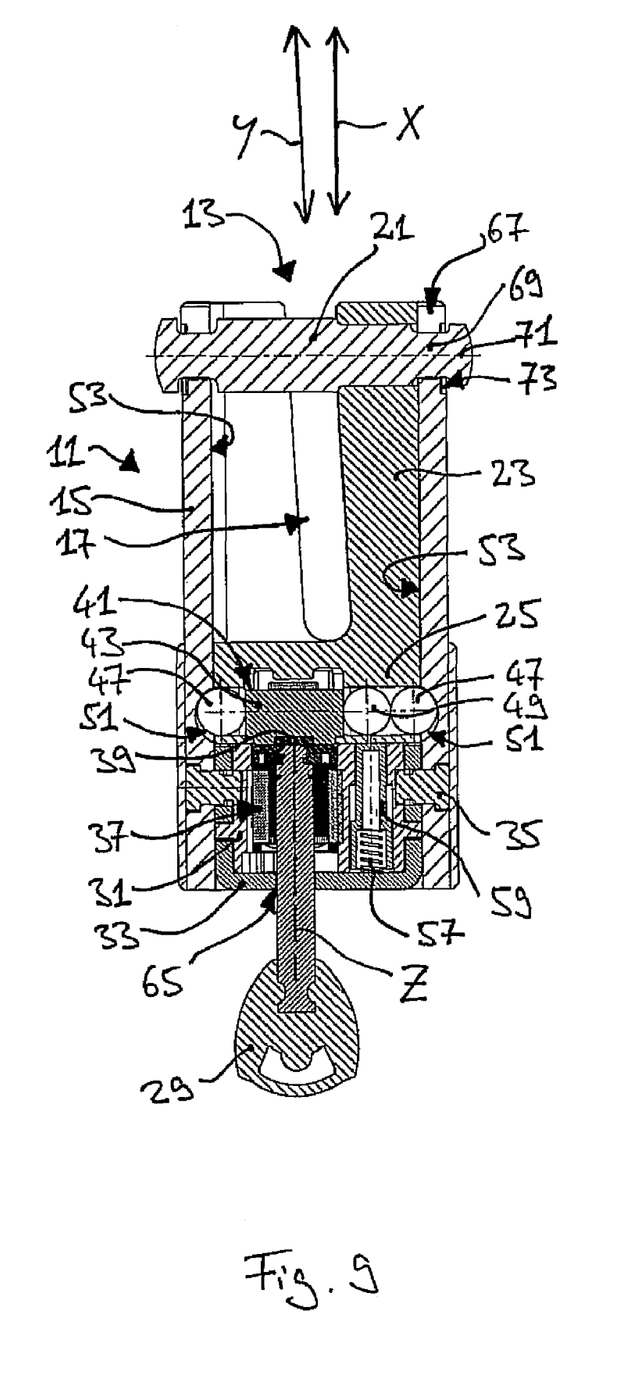
FIG. 9 shows a central longitudinal section of the brake disk lock in the closed position of the hoop.
Figure 10:
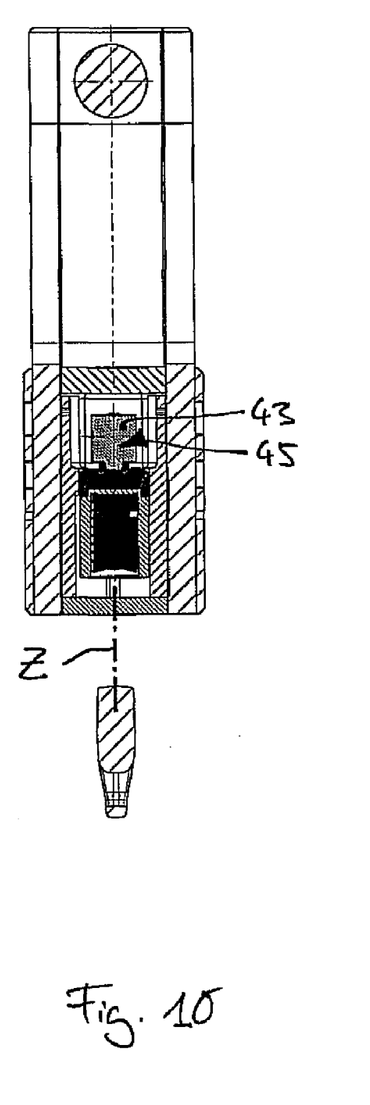
FIG. 10 shows a central longitudinal section along a plane which is perpendicular to the sectional plane in accordance with FIG. 9.

By rotating the driver 39 by means of the key 29 into the unlatched position, the latch elements 47 can escape radially inwardly (again with respect to the axis of actuation Z) when the hoop 13 should be placed from the closed position in accordance with FIG. 9 into the open position in accordance with FIG. 7. For this movement along the direction X, the hoop 13 is supported at two mutually oppositely disposed guide surfaces 53 at the inner side of the outer housing 15. The two guide surfaces 53 during this movement of the hoop 13 simultaneously secure the two latch elements 47 against an outward falling out of the holding section 25 of the hoop 13. Inwardly, in contrast (that is in the direction of the axis of actuation Z of the locking mechanism 37), the latch elements 47 can be captured in the holding section 25, for example due to a cross-sectional tapering.

A particular advantage of the brake disk lock shown comprises the fact that the housing has a simple and stable structure. The outer housing 15 is made from a tubular section machined with a small effort and the inner housing 31 also does not require any special structure for the reception of the latch elements 47 and of the spacer element 49. These elements 47, 49 of the latching device 41 are instead received in a through going bore 55 in the holding section 25 of the hoop 13.

The brake disk lock furthermore has a narrow construction shape within the plane of extent of the hoop 13 (FIGS. 7 and 9) with respect to a direction perpendicular to the direction of movement X of the hoop 13 or of the axis of actuation Z of the locking mechanism 37. This is achieved in that the hoop 13 is not, for instance, arranged between the respective latch element 47 and the outer housing 15, as with known padlocks, but rather engages around the latch element 47. The latching of the hoop 13 to the outer housing 15 in this respect takes place in that the latch elements 47 cooperate at the outer side of the hoop 13 remote from the axis of actuation Z with the outer housing 15 (i.e. at the partition surface between the hoop 13 and the guide surfaces 53 of the outer housing 15).

Further advantages of the brake disk lock will be explained in the following:

The hoop 13 is biased in the direction of the open position. A simplified handling hereby results since the hoop 13 is automatically ejected from the lock body 11 solely by an unlatching actuation of the locking mechanism 37 and thus of the driver 39 so that the free end 27 of the securing section 21 can be introduced into the respective ventilation opening of the brake disk. As soon as this has taken place, the lock body 11 is placed onto the brake disk against the bias until the hoop 13 again adopts the closed position and is latched in it. An expulsion spring 47 having an ejection pin 59 is provided in the inner housing 31 for the explained bias (FIG. 9). A securing bolt 61 inserted into the outer housing 15 cooperates with a guide groove 63 of the connection section 23 of the hoop 13 (FIG. 3) to prevent the hoop 13 from falling out of the outer housing 15. The hoop 13 is therefore hereby permanently secured at the lock body 11.

It is further of advantage with respect to the use as a brake disk lock that the reception gap 17 does not extend precisely parallel to the direction of movement X of the hoop 13 or of the axis of actuation Z of the locking mechanism 37, but rather at an acute angle thereto (cf. FIG. 9). An improved accessibility of the locking mechanism 37 hereby results for the user when the brake disk lock is fixed to a brake disk of a vehicle.

A simplified handling further results in that the lock body 11 has a key introduction opening 65 for the key 29 (FIGS. 7 and 9) which is provided at a side of the lock body 11 remote from the reception gap 17, with the key introduction opening 65 being arranged laterally offset with respect to the direction of extent Y of the reception gap 17 (in accordance with the axis of actuation Z of the locking mechanism 37). The off-center arrangement of the locking mechanism 37 is made possible by the spacer element 49.

Finally, a special advantage of the brake disk lock shown is also the cooperation of the securing section 21 of the hoop 13 with the outer housing 15 of the lock body 11. The outer housing 15 has two introduction slits 67 at the side into which a respective connection neck 69 of the securing section 21 engages when the hoop 13 is moved into the outer housing 15 (closed position in accordance with FIG. 9). The most extreme ends of the securing section 21 of the hoop 13 are formed by a respective widened blocking portion. The two widened blocking portions 71 slightly project beyond the outer housing 15 in the closed position of the hoop 13 (FIGS. 4 and 9). Two engagement recesses 73 whose periphery is slightly larger than that of the respective widened blocking position 71 (FIGS. 5 and 9) are formed at the outer side of the outer housing 15 flush with the widened blocked portions 71 at the outer housing 15.

A typical attempted breaking open comprises, in a brake disk lock, that a chisel is hammered into the reception gap 17, and indeed into the intermediate space between the brake disk and the lock body 11. The reception gap 17 should hereby be widened such that the hoop 13 (in particular the securing section 21) no longer closes the reception gap 17 and the lock can ultimately be removed from the brake disk. However, this is prevented in the brake disk lock shown in that in the case of such a spreading apart of the outer housing 15, the widened blocking portions 71 of the securing section 21 move into engagement with the engagement recess 73 of the outer housing 15 and the securing section 21 of the hoop 13 thus claws to the outer housing 15.

The invention claimed is:

1. A hoop lock having a lock body and having a hoop which is movable relative to the lock body along a hoop moving direction between an open position and a closed position, wherein the lock body has a lock housing and a locking mechanism which is fixedly connected to the lock housing and has a driver, wherein the driver is selectably movable into an unlatched position or into a latched position, wherein furthermore a latching device is provided in the lock housing and is effective between the driver of the locking mechanism, the hoop and the lock housing, wherein the latching device latches the hoop to the lock housing when the hoop is in the closed position and the driver of the locking mechanism is in the latched position, wherein the latching device comprises a latch element which is movable transversely with respect to the hoop moving direction into a release position when the driver is in the unlatched position, wherein said latch element in the release position is movable together with the hoop along the hoop moving direction between the open position and the closed position of the hoop.

2. A hoop lock in accordance with claim 1, wherein said latch element is received in a holding section of the hoop, while the hoop moves between the open position and the closed position.

3. A hoop lock in accordance with claim 2, wherein said latch element is partly received in the holding section of the hoop and partly engages into an engagement opening of the lock housing when the hoop is in the closed position and the driver of the locking mechanism is in the latched position.

4. A hoop lock in accordance with claim 2, wherein the holding section of the hoop engages around the movable part of the latching device.

5. A hoop lock in accordance with claim 2, wherein the holding section of the hoop remains in the lock body while the hoop moves between the open position and the locked position.

6. A hoop lock in accordance with claim 2, wherein the hoop is movably journalled at a guide surface at an inner side of the lock housing, wherein the guide surface of the lock body secures the movable part of the latching device in the holding section of the hoop while the hoop moves between the open position and the closed position.

7. A hoop lock in accordance with claim 1, wherein the latching device cooperates at an outer side of the hoop with the lock housing to latch the hoop to the lock housing when the hoop is in the closed position and the drive of the locking mechanism is in the latched position.

8. A hoop lock in accordance with claim 1, wherein the latching device further has at least one rotationally movable drive element, wherein the drive element is coupled or couplable to the driver of the locking mechanism and has a cam section which cooperates with the at least one latch element to move it when the driver is moved from the unlatched position into the latched position.

9. A hoop lock in accordance with claim 8, wherein the drive element of the latching device is rigidly coupled to the driver of the locking mechanism.

10. A hoop lock in accordance with claim 1, wherein the lock housing has an outer housing which is formed by a tubular section having a longitudinal axis which extends parallel to the direction of movement of the hoop.

11. A hoop lock in accordance with claim 1, wherein the hoop is biased in the direction of the open position.

12. A hoop lock in accordance with claim 1, wherein the hoop is substantially L-shaped in the open position outside the lock body and has an elongate securing section and an elongate connection section, wherein the securing section extends transversely to the direction of movement of the hoop and has a free end, and wherein the connection section extends substantially parallel to the direction of movement of the hoop and connects the securing section to the lock body.

13. A hoop lock in accordance with claim 12, wherein the securing section of the hoop has a widened blocking portion at least at the free end, said widened blocking portion projecting beyond the lock housing when the hoop is in the closed position, wherein the lock housing has an engagement recess at its outer side flush with the widened blocking portion of the securing section of the hoop, wherein the engagement recess is made to receive the widened blocking portion if the lock housing is expanded along the direction of extent of the securing section.

14. A hoop lock in accordance with claim 13, wherein the securing section of the hoop has a respective widened blocking section at its two ends, said widened blocking section cooperating with a respective engagement recess of the lock housing.

15. A hoop lock in accordance with claim 12, wherein the securing section of the hoop is formed by a bolt which is formed separately from the connection section.

16. A hoop lock in accordance with claim 12, wherein the lock body has a reception gap for the reception of an object to be secured, wherein the securing section of the hoop closes the reception gap when the hoop is in the locked position.

17. A hoop lock in accordance with claim 16, wherein the reception gap extends along a reception gap axis oriented at an acute angle to the hoop moving direction.

18. A hoop lock in accordance with claim 17, wherein the lock body has a key introduction opening which is provided at a side of the lock body remote from the reception gap, wherein the key introduction opening is arranged laterally offset with respect to the reception gap axis.

19. A hoop lock in accordance with claim 16, wherein the lock body has a key introduction opening which is provided at a side of the lock body remote from the reception gap, wherein the key introduction opening is arranged laterally offset with respect to the direction of extent of the reception gap.

20. A hoop lock in accordance with claim 1, wherein the locking mechanism is formed by a lock cylinder which has a cylinder housing fastened in the lock housing and a cylinder core rotatable in the cylinder housing, wherein the driver is provided at the cylinder core.

21. A hoop lock in accordance with claim 1, wherein the at least one latch element comprising a latching ball.

* * * * *